United States Patent

[11] 3,543,783

| [72] | Inventor | Richard Joseph Ifield<br>Beecroft, New South Wales, Australia |
|---|---|---|
| [21] | Appl. No. | 720,780 |
| [22] | Filed | April 12, 1968 |
| [45] | Patented | Dec. 1, 1970 |
| [73] | Assignee | Joseph Lucas (Industries) Limited<br>Birmingham, England |

[54] FLOW CONTROL DEVICES
4 Claims, 2 Drawing Figs.

[52] U.S. Cl............................................. 137/101,
 137/111, 137/118
[51] Int. Cl............................................... G05d 11/00
[50] Field of Search........................................ 37/101,
 109(US), 111

[56] References Cited
UNITED STATES PATENTS

| 2,466,485 | 4/1949 | Schultz.................... | 137/101 |
| 2,643,664 | 6/1953 | Willett...................... | 137/101 |
| 2,778,372 | 1/1957 | Jaquith..................... | 137/111 |
| 3,021,859 | 2/1962 | Liantonio et al.......... | 137/101 |
| 3,421,533 | 1/1969 | Conn........................ | 137/101 |

*Primary Examiner*—William F. O'Dea
*Assistant Examiner*—David J. Zobkiw
*Attorney*—Holman, Glascock, Downing & Seebold ABSTRACT: A flow control device comprising a body having a single port and two passages between which flow is to be controlled, a member movably mounted within the body, restricted passages in the member these restricted passages communicating with the passages in the body and with the port respectively, the position of the member determining the proportions of the flows through the restricted passages respectively, and further passages whereby the pressures in the restricted passages are applied to the member to determine its position.

FLOW CONTROL DEVICES

This invention relates to devices for controlling the flow of fluid through the device from a single port to a pair of passages or from a pair of passages to a single port.

The object of the invention is to provide a flow control device of this kind in a convenient form.

In accordance with the present invention a flow control device comprises a body defining a pair of passages and a single port, the device being arranged to control flow between said passages and the port, a member movably mounted within the body, said member defining a pair of restricted passages affording communication between the passages in the body and the port respectively, the position of the member within the body determining the proportions of the flow through the restricted passages in the member respectively, and further passages in the member whereby the pressures existing in the restricted passages respectively are exerted on the member to determine its position in the body.

Figure 1:
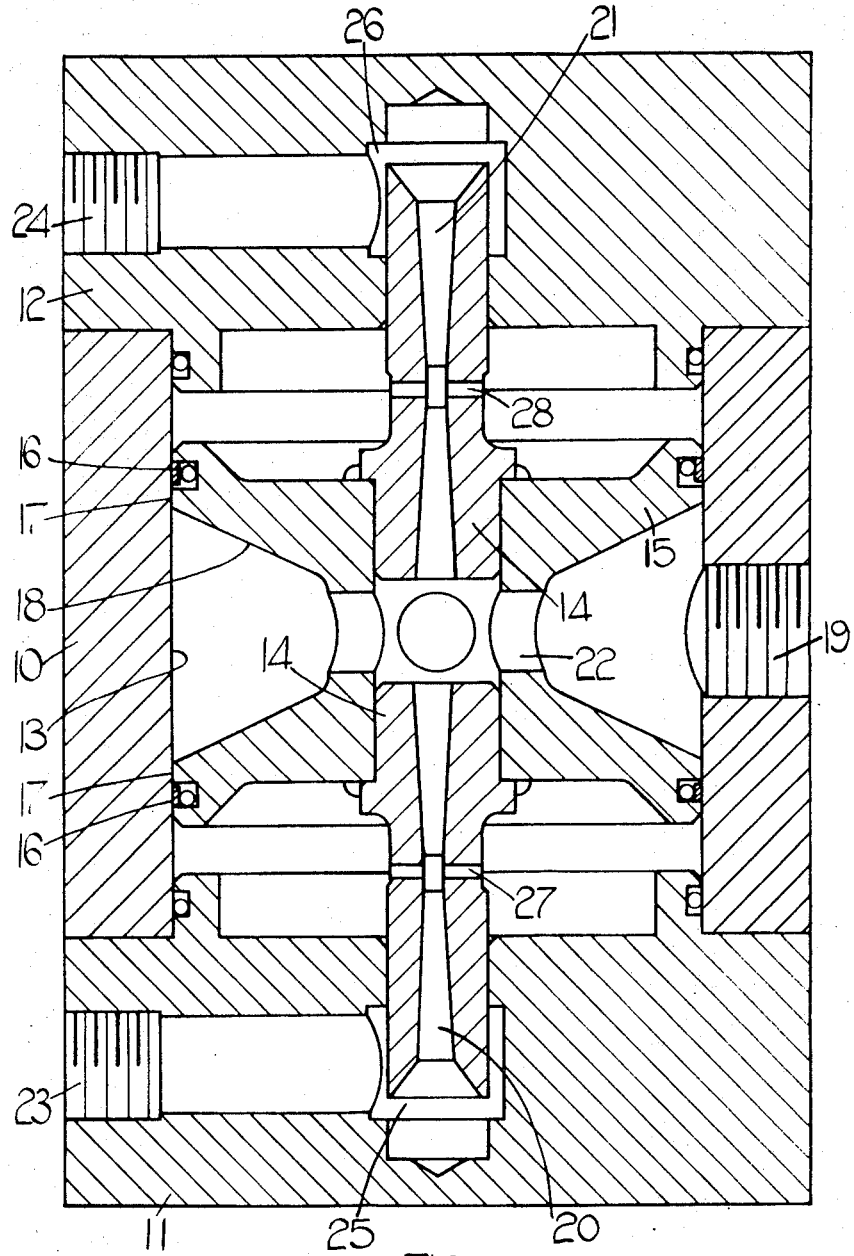
Figure 2:
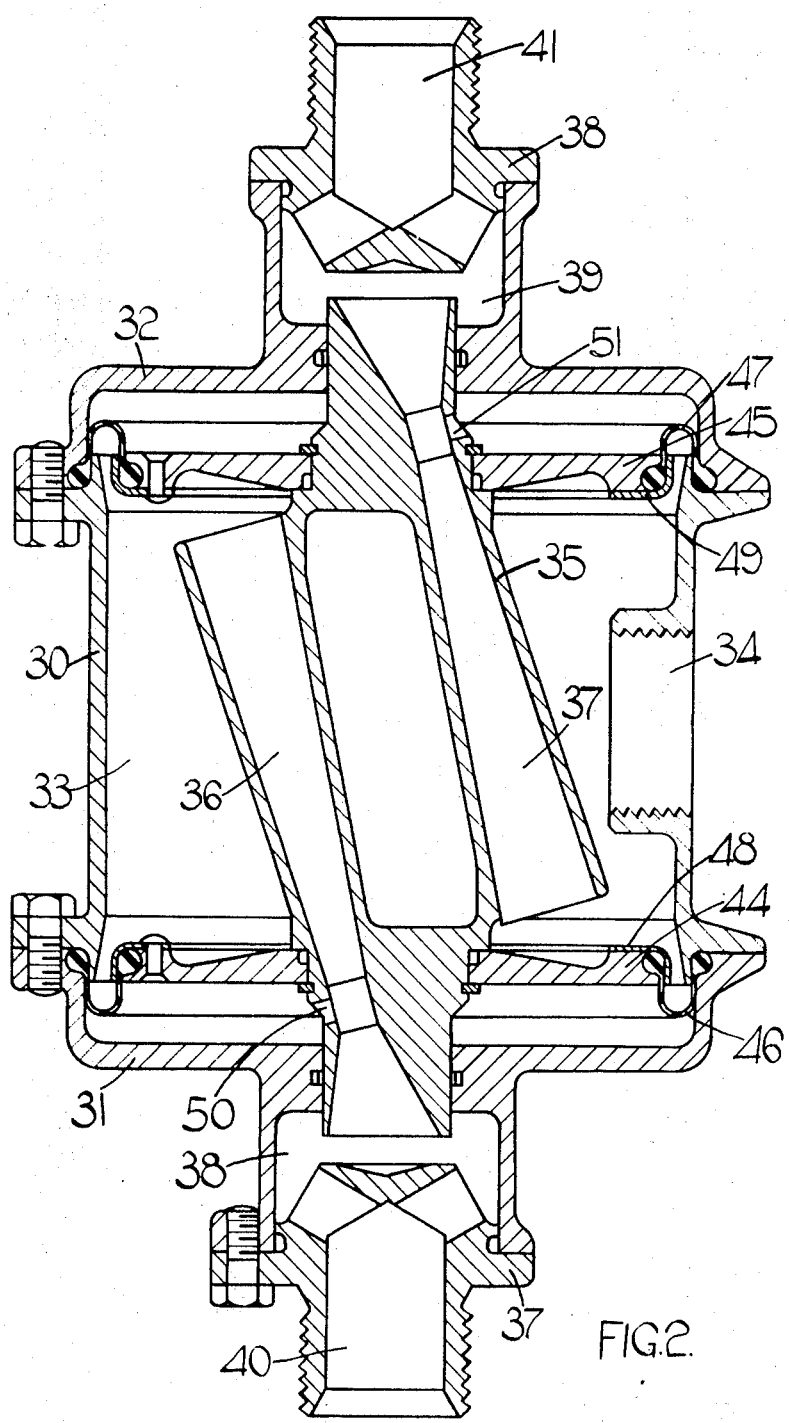

The invention will now be described by way of example with reference to the accompanying drawings in which:

FIG. 1 is a cross-sectional view of one form of device constructed in accordance with the invention, and FIG. 2 is a cross-sectional view of an alternative form.

With reference to the construction in FIG. 1 there is provided a body 10 having end members 11, 12 secured to it, and the body 10 defining with the end members 11, 12 a cylindrical cavity 13 within which is disposed a composite member comprising a pair of cylindrical parts 14 secured concentrically in a piston 15 which is slidably mounted in the cylindrical cavity 13 in the body 10. The piston 15 is provided with a pair of annular surfaces 17 having sealing rings 16 respectively, which engage the cylindrical wall of the cavity 13. Between these surfaces is defined a deep annular groove 18 which at all positions of the composite members 14, 15 is in communication with an inlet (or outlet) port 19 formed in the body 10.

Within the members 14 respectively are formed a pair of venturi shaped passages 20, 21 and the adjacent ends of these are in communication with the deep annular groove 18 in the piston 15 through radial openings 22 communicating with the base of the annular groove 18. The passages 20, 21 are in communication at all times with the inlet (or outlet) port 19 of the body 10.

The ends of the passages 20, 21 remote from the inlet (or outlet) port 19 communicate with outlet (or inlet) passages 23, 24 respectively in the end members 11, 12. These passages 23, 24 open into chambers 25, 26 into which the outwardly presented ends of the members 14 extend. The positions of these ends of the members 14 determine the restriction of flow of fluid through the chambers 25, 26 into the passages 23, 24 respectively.

In the members 14, there are also provided respective further radial passages 27, 28 communicating at the throats of the venturis in the passages 20 and 21 respectively, these passages 27, 28 affording communication between the venturi passages 20, 21 and the ends of the cavity 13 in the body 10 at opposite sides of the piston 15 respectively.

The ratio of the pressures existing in the radial passages 27, 28 and thus at opposite sides of the piston 15 is determined by the rate of flow of fluid through passages 20 and 21. The choice of the size of these passages 20, 21 determines the proportion of the flow which enters through the inlet port 19 and escapes through the outlet passages 23, 24 or alternatively enters through the inlet passages 23, 24 and escapes through the outlet port 19., depending upon the direction of flow.

With reference to the construction illustrated in FIG. 2, there is provided a body 30 to which are attached a pair of end members 31, 32 respectively, and within these is defined an interior cavity 33 with which an inlet (or outlet) port 34 communicates.

Within the body 30 and disposed in the cavity 33 is a member 35 having cylindrical end portions slidably mounted in the end members 31, 32 respectively. In this member 35 are provided a pair of parallel venturi shaped passages 36, 37, the axes of which are inclined to the axes of the cylindrical end portions of the member 35. The end portion of the member 35 extend into respective cavities 38, 39 formed in the end members 31, 32 respectively. The positions of the end portions of the member 35 with respect of the respective end walls of the cavities 38, 39 determine the proportion of the flow through the passages 36, 37 and through a pair of outlet (or inlet) passages 40, 41. These passages 40, 41 are respectively formed in caps 42, 43 attached to the end members 31, 32 respectively.

Surrounding the member 35 and connected to it at positions between the adjacent ends of the passages 36, 37 which communicate with the inlet (or outlet) port 34, are a pair of parts 44, 45 which are connected to the wall of the cavity 33 within the body 30 and end members 31, 32 by respective flexible seals 46, 47. These seals 46, 47 are retained on the parts 44, 45 respectively by a pair of plates 48, 49.

Moreover, there are further passages 50, 51 affording communication between the throats of the venturis of the passages 36, 37, and the spaces defined at the ends of the cavity 33 respectively between the end members 31, 32 and the members 44, 45.

As in the example illustrated in FIG. 1, the flow of fluid through the passages 36, 37 determines the pressures applied to the parts 44 and 45, thus determining the position of the member 35 which, in turn, controls the proportional flow through the outlet (or inlet) passages 40, 41. As in the case of FIG. 1, it is to be understood that the device can be operated with the passages 40, 41 serving as inlets to provide proportional flow to the single port 34 serving as an outlet.

I claim:

1. A flow control device comprising a body defining a pair of passages and a single port, a member movably mounted within a cavity located in the body, said member defining a pair of restricted passages affording communication between the passages in the body and the port respectively, the restricted passages in the member defining respective venturis, said member and said body coacting so as to determine the proportions of flow through the restricted passages according to the position of said member in said body, said member and said body defining fluid pressure responsive means at opposite portions of said body, and further passages in the member communicating the pressures existing at the throats of the venturis with the respective fluid pressure responsive means to determine the position of the member in said body.

2. A device as claimed in claim 1 in which the fluid pressure responsive means includes a piston, to opposite sides of which pressures are applied through the further passages in the member respectively.

3. A device as claimed in claim 1 in which the member has two parts secured thereto and connected to the body by flexible seals, these parts being disposed at opposite sides of the port in the body respectively, the further passages in the member communicating with the spaces defined between the parts and the ends of the body respectively and wherein said spaces define said fluid pressure responsive means.

4. A device as claimed in claim 1 in which the ends of the member extend into cavities with which the passages in the body communicate respectively, and the positions of the ends of the members within the cavities determining the flow through the restricted passages in the member respectively.